Dec. 31, 1929.   K. E. LYMAN ET AL   1,741,860
AUTOMATIC TRANSMISSION
Original Filed July 26, 1928   3 Sheets-Sheet 2

INVENTORS
KENNETH E. LYMAN
ALBERT M. LANE
BY
*Allen H. Knight*
ATTORNEY

Dec. 31, 1929.    K. E. LYMAN ET AL    1,741,860
AUTOMATIC TRANSMISSION
Original Filed July 26, 1928    3 Sheets-Sheet 3

INVENTORS
KENNETH E. LYMAN
ALBERT M. LANE
BY
*William L. Knight*
ATTORNEY

Patented Dec. 31, 1929

1,741,860

UNITED STATES PATENT OFFICE

KENNETH E. LYMAN AND ALBERT M. LANE, OF ROCKFORD, ILLINOIS, ASSIGNORS TO AUTOMATIC TRANSMISSION COMPANY, OF ROCKFORD, ILLINOIS, A CORPORATION OF ILLINOIS

AUTOMATIC TRANSMISSION

Application filed July 26, 1928, Serial No. 295,572. Renewed November 18, 1929.

The present invention relates in general to power transmitting mechanisms and has particular reference to an improved automatic transmission which is especially adaptable for use in connection with motor driven vehicles.

The principal object of the invention resides in the provision of a mechanism of the character described which is capable of establishing a gradual speed ratio variation, preferably from zero to maximum, and controlled automatically by a condition existing in the mechanism, as for example the variations in speed and torque between a driven element and a driving element.

While the foregoing explains briefly the nature of the invention other objects and advantages not herein specifically referred to will be readily appreciated upon a full comprehension of the novel features presented in the construction, arrangement and manner of operation of the transmission.

In order that the invention may be readily understood an embodiment of the same is set forth in the accompanying drawings and in the following detailed description.

It is understood that those skilled in the art may make various changes in the construction and arrangement of the parts without departing from the spirit and scope of the invention as defined in the subjoined claims, and we therefore do not wish to be restricted to the precise construction contained herein.

In the drawings:

Figure 5 is a sectional view taken on the line 5—5, Figure 1.

Figure 1:
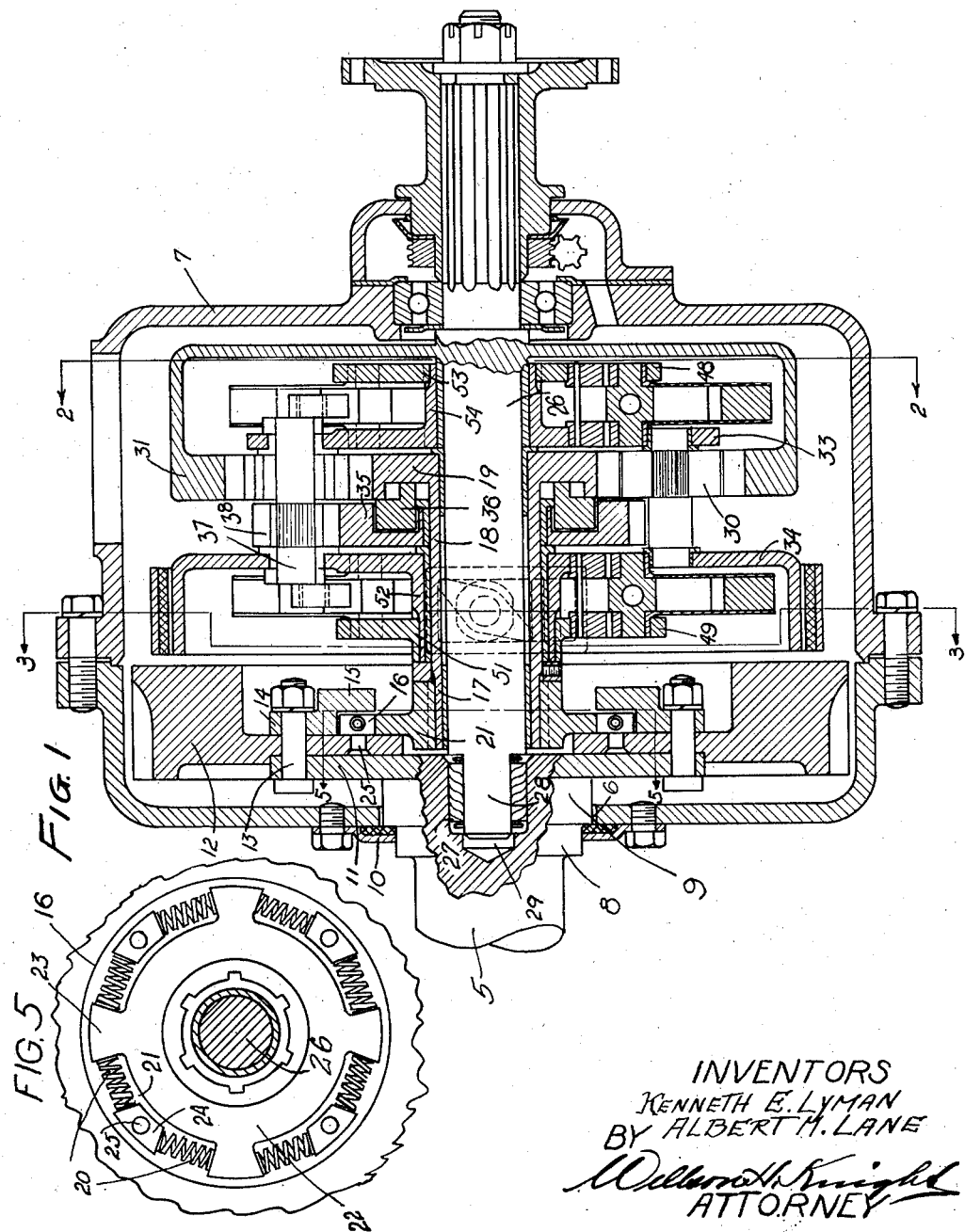
Figure 1 is a vertical longitudinal section on the line 1—1, Figure 2, illustrating preferred embodiment of the invention.

Referring now to the drawings in detail: 5 represents a drive shaft which enters an opening as at 6 in one side of the transmission housing 7. The extremity of the shaft 5 is preferably made with stepped diameters 8 and 9, the larger one of which serving as a bearing surface, and the smaller one of which cooperating with an annular overlapping flange 10 for sealing the opening through which the shaft enters the housing.

The larger diameter 9 of the shaft carries a radial flange 11 which serves as a mounting plate for the fly wheel 12. For this purpose bolts 13 may be used, the bolts being also utilized to mount the plate 14 on the opposite side of the fly wheel. This plate is made with an offset 15 to provide an annular recess between it and the face of the fly wheel for accommodating a flexible driving connection 16, best illustrated in Figure 5.

The connection 16 is splined as at 17 on a sleeve on the forward end of a sleeve 18 which carries at its opposite end the primary sun gear 19. It will thus be seen that the mechanism is a sun gear drive.

The flexible drive connection 16 between the driving shaft and the sun gear 19 is provided to absorb engine vibrations and other pulsations in the drive and eliminate them from the transmission. The connection is preferably made so that these vibrations and pulsations are absorbed when the transmission is in both forward and reverse drives.

According to the illustration in Figure 5, the flexibility of the connection is realized by means of a series of coil springs 20 which are arranged in pairs in each of a series of spaced recesses 21 on the periphery of a ring member 22. The ring member is made with radial projecting lugs 23 against which the ends of the springs abut, with the opposite ends of the springs abutting the blocks 24 mounted in the recesses 21 intermediate the lugs 23, pins 25 being employed to hold the blocks 24 in place.

As best illustrated in Figure 1 pins 25 extend through the web of the fly wheel. The driven shaft 26 enters the housing 7 on the side opposite the driving shaft 5 and extends substantially the entire length of the housing with a roller bearing 27 providing a journal for the reduced end 28 thereof which projects into the axial bore 29 in the end of the driving shaft. Practically all of the transmission mechanism in the housing 7 is supported by the driven shaft 26 and the forward end of the driven shaft is in turn supported by the driving shaft. This cooperative relationship of the driving and driven shafts enables the transmission mechanism to be assembled in a comparatively restricted confining space without sacrificing a rugged construction and other necessary features of construction.

Figure 2:
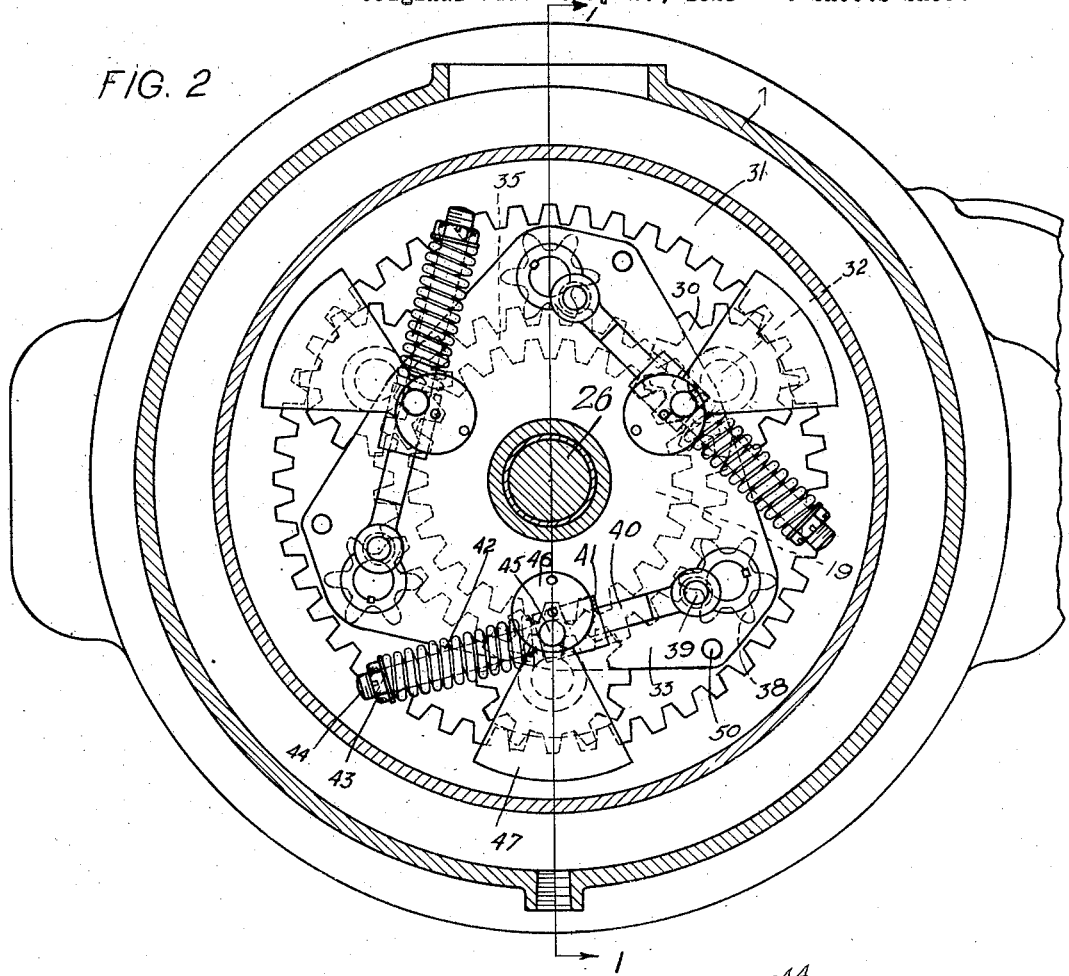
Figure 2 is a view in cross section taken on the line 2—2, Figure 1.

For the purpose of distinguishing the sun gear 19 from another sun gear which will be hereinafter described, it will now be referred to as a primary sun gear, and as shown in Figures 1 and 2, the same meshes with a plurality of primary planet gears 30 which in turn are in constant mesh with the ring gear 31. The ring gear 31 is mounted in fixed relation to the driving shaft 26.

With the construction so far described it will be seen that the drive from the driving shaft 5 is transmitted to the sun gear 19 then through the planet gears 30 to the ring gear 31 and to the driven shaft 26. The gear ratio between the sun gear, planet gears and ring gear will develop a multiplication of torque at low speed for forward drive through the mechanism, and also for reverse drives which will be more specifically hereinafter referred to.

The planet gears 30 are mounted on the planet shafts 32 and the shafts 32 are journaled at one end in a plate 33 and their opposite ends are journaled in the side of the brake drum 34.

Journaled on the sleeve 18 of the primary sun gear 19 is a secondary sun gear 35 which is of larger diameter than the primary sun gear. The two sun gears are connected by a one-way clutch 36 so that the secondary sun gear may rotate ahead of the primary sun gear, but is restrained from rotating in an opposite direction. Any one-way clutching device suitable for the purpose may be used for this connection, such for instance as that shown in connection with our application Serial No. 291,298, filed July 9, 1928.

Journaled on each of the planet shafts 37 is a six tooth secondary planet gear 38 which mesh only with the secondary sun gear 35. The secondary planet gears 38 are keyed on the shafts 37, and each carries eccentric pins 39 at their opposite ends which project through the plate 33 and the brake drum 34 and have connected therewith the reciprocating rods 40. These rods are slidably mounted in blocks 41 and carry coil springs 42. The springs are confined on the rods by means of adjustable nuts 43 threaded on the end 44 of the rods with the opposite ends of the springs bearing against the end of the blocks 41. The blocks 41 are pivoted by means of pins 45 between the trunnion ears 46 on the weights 47. These trunnion ears are in turn mounted with freedom of rotation in openings made to receive them in the plates 33 and 48 on one side of the sun gears, and in the brake drum 34 and the plate 49 on the opposite side of the sun gears. In other words, there are two sets of these weights, preferably three in each set and with each set mounted on opposite sides of the sun gears as stated.

The mechanism has been developed for the purpose of producing a gear change construction possessing the features of non-tranmission of power when the drive shaft is rotating at a slow speed. When the driving shaft is increased in speed the driven shaft is caused to rotate with a variable drive at a decreased speed and with a multiplication of torque, and when the torques of the driving and driven shafts are substantially balanced, a unit drive is effected.

A further feature is the limitation of maximum torque which the drive shaft may transmit through the mechanism in a unit drive, and if more torque is produced by the driving unit than that which has been predetermined, the mechanism operates at a variable speed with increased torque to the driven member.

Further, such construction automatically establishes an operating condition where changes in torque between the drive and driven members, or vice versa, actuates the mechanism to produce a variable drive and corresponding torque multiplication.

It may be noted that a predetermined amount of torque may be established so that in the mechanisms as it is applied to an automotive device, a variable speed and torque ratio may be available at all speeds up to the co-incidental speed of predetermined torque setting and driving torque.

The operation of the mechanism is substantially as follows: Rotation of the driving shaft will develop a planetating movement in the mechanism, the drive being taken in on the primary sun gear 19. The drive is received by the ring gear 31 which is fixed on the driven shaft 26. With slow speed of drive, the weights remain in their inner position and the torque delivered is of small amount.

The purpose of the spring devices and the weights is to automatically control the mechanism and to establish an increasing torque ratio with speed changes of the driving shaft thereby increasing the torque sufficiently to start the driven shaft in motion at a low speed ratio and multiplication of torque.

With increase of speed of the carrier for the spring devices and the weights, the weights move outward increasing the resistance in the springs to the reciprocating motion of the draw rods. When the centrifugal force established in the weighs has moved the weights to their most outward position, a predetermined tension is established in the springs which in turn limits the retarding effect to substantially a constant amount of minimum and maximum intensity. In a like manner for any position of the weights, a predetermined tension of maximum and minimum amounts is established as a retarding effect through the resilient spring member.

It may be noted that at all planetating speeds there is an oscillation of the weights except at very low speeds, and a motion in the resilient or spring members, and that the oscillation of the weight becomes less with increase of driving speed and the movement of the resilient member becomes greater. Thus this mechanism permits a change into a unit drive from a speed ratio or vice versa, at any point in operation with an unbalancing of the power input and the load output sufficient to overcome the predetermined resistance established by the springs and weights, and for any motor car use this change may be effected at any speed below that point in speed torque characteristic of the driving unit where the speed torque relation is equal to the predetermined setting of the transmission mechanism.

Thus it will be seen that this mechanism permits a change from a speed ratio into a unit drive or vice versa, at any stage in the operation of the mechanism in which the power input and the power output become substantially unbalanced in either direction. In other words, the planetating movement in the mechanism which occurs at speed ratios must establish rotation of the secondary planet gears, and as a result the draw rods are reciprocated against the resistance offered by the springs, the weights cooperating in this respect to increase the resistance of the springs so as to increase the retarding effect for establishing a unitary drive.

Figure 6:
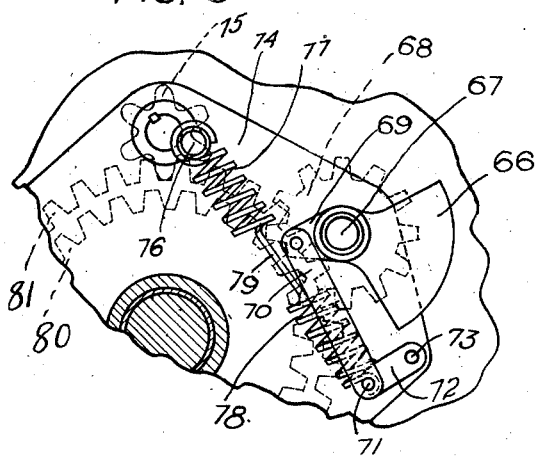
Figure 6 is a detail fragmentary view of a modified form of the weight controlling device, and, Figure 7 is a detail view in elevation of that type of weight and controlling device illustrated in Figures 1 and 2.
Figure 7:
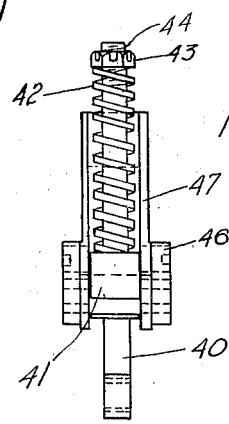
Figure 3:
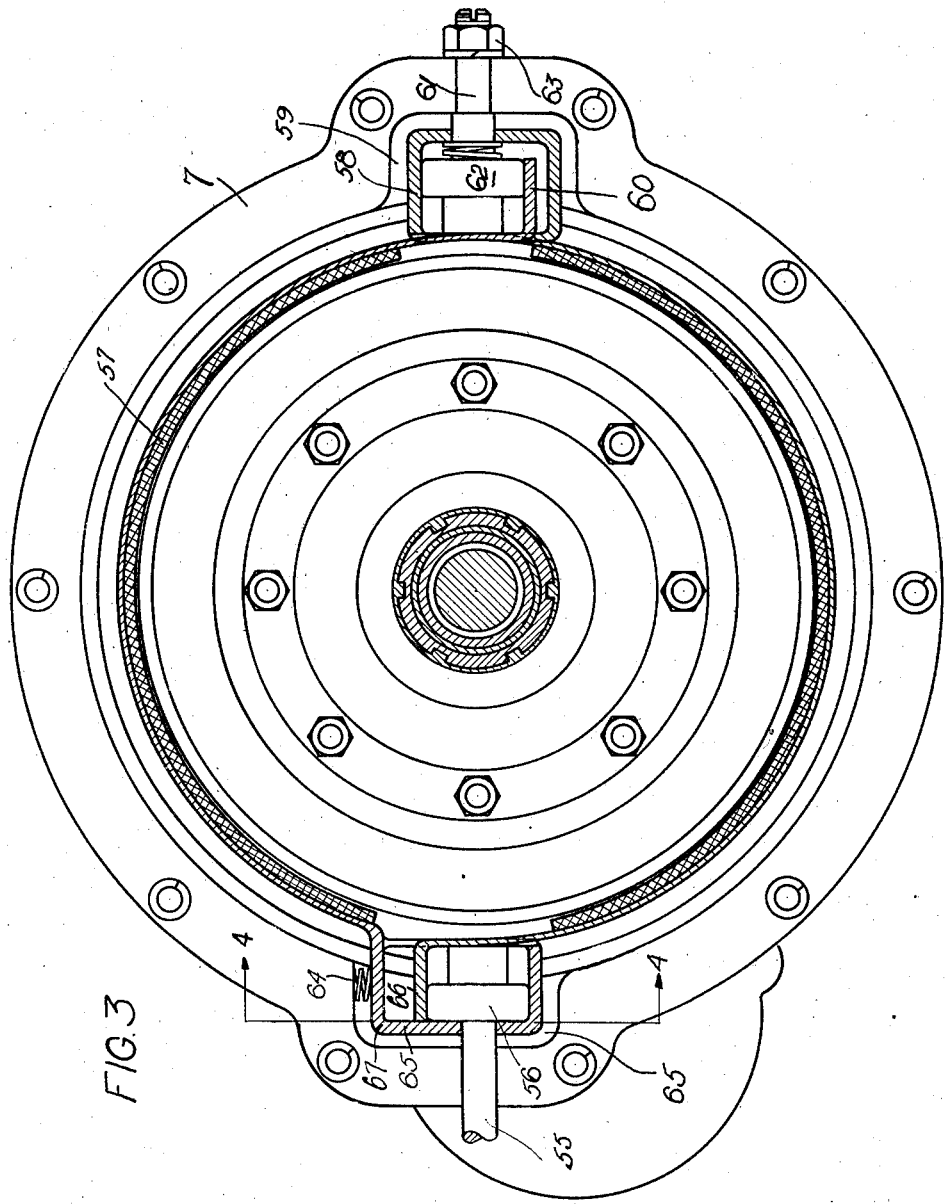
Figure 3 is a cross section taken on the line 3—3, Figure 1.
Figure 4:
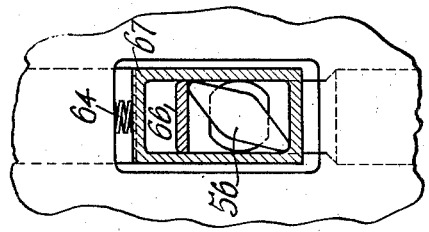
Figure 4 is a detail view in section taken on the line 4—4, Figure 3.

In this modified construction of the mechanism illustrated in Figure 6, the weight 66 is mounted on the planetating shaft 67 of the gear 68, and the same is made with a tail piece 69 to which the link 70 is pivotally connected at one end, with its opposite end pivoted as at 71 to a short link 72 which in turn is pivoted as at 73 to the carrier 74.

The secondary planetating gear 75 has an eccentric pin 76 to which one end of the spring device is anchored. The spring device in this instance comprises a coil section 77 and a spaced cooperating coil section 78 which is anchored to the pivot 71 of the link 70. The coils are connected by an intermediate length 79 of the spring.

The primary and secondary sun gears are illustrated as at 80 and 81 respectively.

The principle of operation in this modified construction is substantially the same as in the previously described form in that the planetating movement of the mechanism is slowed down or retarded through the secondary planetating gear 75 and the resistance offered by the tension of the spring device, in other words, as the planetating gear 75 rotates, it does so against the resistance offered by the spring device.

The weight 66, in responding to centrifugal force, that is to say, moving outwardly, imparts a thrust to the link 70 which develops a tensile pull in the spring and increases the tension of the same. In all other respects, that is to say in results obtained, the action is identical in principle with the other form of the device.

For effecting a reverse drive in the mechanism, the brake drum 34 is arrested by manually operable means so as to reverse the rotation of the primary planetating system and thus drive the ring gear 31 in a reverse direction. To arrest the rotation of the brake drum a brake band 57 is employed, the same being made in two sections, the end of one section on one side being made with a box-like enclosure 58 with the end of the opposite section inserted therein and terminating in a shelf-like projection 60.

The housing 7 is made with a projecting area 59 for accommodating the ends of the brake band sections on this side of the mechanism, and a rod 61 extends therein which carries a camming head 62 so that rotation of the rod 61 will rotate the head 62 and spread the ends of the brake band sections apart. Any desired adjustment in this respect may be maintained by the nut 63 on the threaded end of the rod 61.

The opposite ends of the sections are arranged in somewhat the same manner in that the rod 55 carries a camming head 56 which is adapted to spread the ends 66 and 67 apart against the influence of the spring 64. The ends of the brake band on this side of the mechanism are confined within the space 65 made by a projection on the side of the housing 7.

The rod 55 is adapted to be connected with a manually manipulated lever, or the like, which is within easy reach of the operator so that rotation of the rod will rotate the camming head 56 and cause the brake band sections to firmly grip the drum and arrest its rotation. Rotation of the rod 55 in an opposite direction will impart a reverse rotation to the camming head 56 and release the brake band so that the brake drum is free to rotate for forward speeds.

In describing the construction and operation of the mechanism from one view point, it will be noted that in both forms of the invention the automatic ratio changing means comprises a mechanism for influencing the rotation of the planetating power transmitting elements. In the embodiment, illustrated in Figs. 1 and 2, the power transmitting elements are represented by the planet gears 30. The rotation of these gears about their own axis is influenced by the control which is transmitted through the sun gear 19; the overrunning clutch 36 and the gear train consisting of the sun gear 35, pinions 38 and the spring devices. The effect of the spring devices being varied by the action of the centrifugal weights. In other words, the rotation of the planet gears 30 about their own axis is influenced by a resiliently restrained gear train and the weights serve to vary the restraining effect imparted by the gear train or the weights serve as speed responsive means for varying the yieldable load imposed on the gear train.

In the modified form illustrated in Fig. 6, the same effect is realized with a change in construction.

Having thus described and shown an embodiment of our invention, what we claim and desire to secure by Letters Patent of the United States is:

1. In a transmission, driving and driven shafts, planetary change speed mechanism connecting said shafts and means for automatically controlling said mechanism comprising, a plurality of spring devices, draw rods on which said spring devices are mounted, eccentric connections between said draw rods and rotatable elements in said planetary change speed mechanism, a plurality of centrifugal weights, each of said weights having a pivoted block thereon through which said draw rods extend, said spring devices being confined on said draw rods between said blocks and anchoring means on the ends of the rods; whereby reciprocation of the rods will be resisted by the spring devices.

2. In a transmission, driving and driven shafts, planetary change speed mechanism connecting said shafts and means for automatically controlling said mechanism comprising, a plurality of spring devices, draw rods on which said spring devices are mounted, eccentric connections between said draw rods and rotatable elements in said planetary change speed mechanism, a plurality of centrifugal weights, each of said weights having a pivoted block thereon through which said draw rods extend, said spring devices being confined on said draw rods between said blocks and anchoring means on the ends of the rods; whereby reciprocation of the rods will be resisted by the spring devices, the outward movement of said weights in response to centrifugal force adapted to increase the tension in said springs and arrest the reciprocation of the draw rods at predetermined speeds.

3. In a transmission, the combination of driving and driven shafts, a primary sun gear driven by said driving shaft, a secondary sun gear connected with said primary sun gear through a one way clutch, primary planet gears meshing with said primary sun gear, a ring gear on the driven shaft meshing with said primary planet gears, secondary planet gears meshing with said secondary sun gear, planet shafts for said secondary planet gears, draw rods eccentrically connected with said secondary planet gears, a revolving carrier, centrifugal weights mounted for oscillation on said carrier, pivoted blocks on said weights through which said draw rods extend and springs on said draw rods bearing against said blocks.

4. In a transmission, driving and driven shafts, planetary change speed mechanism connecting said shafts, comprising a primary sun gear connected in driving relation with the driving shaft, a ring gear connected in driving relation with the driven shaft, planetating gears meshing with said sun gear and with said ring gear, and means for controlling said mechanism, comprising a secondary sun gear, a one way clutch connecting said secondary sun gear with said primary sun gear, secondary planetating gears meshing with said secondary sun gear, draw rods eccentrically connected with said secondary planetating gears, a carrier, oscillating weights mounted on said carrier, pivoted blocks on said weights through which said draw rods extend, and springs on said draw rods bearing against said blocks.

5. In a transmission, driving and driven shafts, planetary change speed mechanism connecting said shafts, comprising a primary sun gear connected in driving relation with the driving shaft, a ring gear connected in driving relation with the driven shaft, planetating gears meshing with said sun gear and with said ring gear, and means for controlling said mechanism, comprising a secondary sun gear, a one way clutch connecting said secondary sun gear with said primary sun gear, secondary planetating gears meshing with said secondary sun gear, draw rods eccentrically connected with said secondary planetating gears, a carrier, oscillating weights mounted on said carrier, pivoted blocks on said weights through which said draw rods extend, and springs on said draw rods bearing against said blocks, and means for reversing the drive through said mechanism.

6. In a transmission, driving and driven shafts, planetary change speed mechanism connecting said shafts, comprising a primary sun gear connected in driving relation with the driving shaft, a ring gear connected in driving relation with the driven shaft, planetating gears meshing with said sun gear and with said ring gear, and means for controlling said mechanism, comprising a secondary sun gear, a one way clutch connecting said secondary sun gear with said primary sun gear, secondary planetating gears meshing with said secondary sun gear, draw rods eccentrically connected with said secondary planetating gears, a carrier, oscillating weights mounted on said carrier, pivoted blocks on said weights through which said draw rods extend, and springs on said draw rods bearing against said blocks, and means for reversing the drive through said mechanism, comprising a mechanically controlled rotatable brake drum and means for arresting the rotation of said drum.

7. In a transmission, driving and driven shafts, mechanism connecting said shafts for establishing a speed ratio variation and means for automatically controlling said mechanism comprising, a speed responsive device, means for imposing resilient resistance on said device and means for intermittently increasing said resistance comprising, a reciprocating draw rod and a spring on said draw rod having one end bearing against the speed responsive device and with its other end bearing against a stop on the draw rod.

8. In a transmission, a planetary gear system, comprising a ring gear, planet gears meshing with said ring gear, a sun gear meshing with said planet gears, a secondary sun gear, a one-way clutch connecting said secondary sun gear with said first named sun gear, planet gears meshing with said secondary sun gear, draw rods eccentrically connected to the planet gears which mesh with the secondary sun gear, springs on said draw rods and weights operatively associated with said springs to move outwardly against the resistance thereof in response to centrifugal force.

9. In a transmission, driving and driven shafts, a housing and change speed mechanism within said housing connecting said shafts, comprising a fly-wheel on the driving shaft, a primary sun gear, a flexible connection between said primary sun gear and said flywheel, a ring gear fixed on the driven shaft, primary planet gears meshing with said sun gear and said ring gear, a secondary sun gear, a one-way clutch connecting said secondary sun gear with said primary sun gear, secondary planet gears meshing with said secondary sun gear, planet shafts for said secondary planet gears, a rotatable brake drum, revolving carriers, oscillating weights having trunnion ears eccentrically mounted in said carriers, pivoted blocks on said weights, draw rods extending through said blocks having one end eccentrically connected to the secondary planet gears and springs carried by the opposite ends of said draw rods and bearing against said blocks.

10. In a transmission, driving and driven elements, planetary gearing for connecting said elements in different speed ratios, a planetating power transmitting element in said planetary gearing and means for automatically changing the ratio, comprising a resiliently restrained gear train and means for causing said gear train to yieldably influence the rotation of said planetating power transmitting element about its own axis.

11. In a transmission, driving and driven elements, planetary change speed mechanism for connecting said elements in different speed ratios and means for automatically changing the ratio, comprising a gear train, a one-way clutch connecting one element of said gear train with one element of said planetary change speed mechanism, means for imposing a yielding load on said gear train and centrifugal responsive means for varying said load.

12. In a transmission, driving and driven elements, planetary gearing for connecting said elements in different speed ratios, a planetating power transmitting element in said planetary gear and means for automatically changing the ratio, comprising a spring restrained gear train and means for causing said gear train to yieldably influence the rotation of said planetating power transmitting element about its own axis.

13. In a transmission, driving and driven elements, planetary change speed mechanism for connecting said elements in different speed ratios, and means for automatically changing the ratio, comprising a gear train, a one-way clutch connecting one element of said gear train with one element of said planetary change speed mechanism, a spring device for imposing a yielding load on said gear train and centrifugal responsive means for varying said load.

14. In a transmission, driving and driven elements, planetary gearing for connecting said elements in different speed ratios, a planetating power transmitting element in said planetary gearing and means for automatically changing the ratio, comprising a gear train, a one-way clutch connecting one element of said gear train with one element of said planetary change speed mechanism and a spring restrained pinion in said gear train.

15. In a transmission, driving and driven elements, planetary change speed mechanism for connecting said elements in different speed ratios, a ring gear and a sun gear in said mechanism, power transmitting planet gears meshing with said ring gear and said sun gear and means for automatically changing the ratio, comprising a gear train, a one-way clutch connecting one element of said gear train with said sun gear, means for imposing a yielding load on said gear train and centrifugal responsive means for varying said load.

16. In a transmission, driving and driven elements, planetary change speed mechanism for connecting said elements in different speed ratios, a ring gear and a sun gear in said mechanism, power transmitting planet gears meshing with said ring gear and said sun gear and means for automatically changing the ratio, comprising a gear train, a one-way clutch connecting one element of said gear train with said sun gear, means for imposing a yielding load on said gear train and centrifugal means responsive to the speed of the driving element for varying said load.

17. In a transmission, driving and driven elements, planetary change speed mechanism for connecting said elements in different speed ratios, a ring gear and a sun gear in said mechanism, power transmitting planet gears meshing with said ring gear and said sun gear and means for automatically changing the ratio, comprising a gear train, a one-way clutch connecting one element of said gear train with said sun gear, means for imposing a yielding load on said gear train and an oscillating speed responsive weight for varying said load.

18. In a transmission, driving and driven elements, planetary change speed gearing for connecting said elements in different speed ratios, planet gears in said gearing having a planetating movement about the axis of the drive transmitted by said driving element when the gearing is operating in a gear ratio, a rotatable planet carrier for said planet gears, means for holding the planet carrier against rotation for reversing the drive through the mechanism and means for automatically changing the ratio in said gearing, comprising a resiliently restrained gear train and means for causing said gear train to yieldably influence the rotation of said planet gears when the gearing is in a forward drive.

19. In a transmission, driving and driven shafts, planetary change speed mechanism connecting said shafts, comprising a sun gear, means for connecting said sun gear in driving relation with said driving shaft, a ring gear on the driven shaft, planetating gears meshing with said sun gear and said ring gear, planetating shafts for said planetating gears, a revolving carrier for said planetating shafts, means for automatically controlling said mechanism, comprising a resilient resistance device, speed responsive means for varying the resistance in said device and manually controlled means for arresting the rotation of the planet shaft carriers for reversing the drive in said mechanism.

20. In a transmission, driving and driven shafts, planetary change speed mechanism connecting said shafts, comprising a sun gear, a flexible connection for connecting said sun gear in driving relation with said driving shaft, a ring gear on the driven shaft, planetating gears meshing with said sun gear and with said ring gear, planetating shafts for said planetating gears, a revolving carrier on opposite sides of said sun gear for said planetating shafts, and means for automatically controlling said mechanism, comprising two sets of resilient resistance devices disposed on opposite sides of the sun gear and speed responsive means for varying the resistance in said devices.

In testimony whereof we have hereunto subscribed our names, July 24, 1928.

KENNETH E. LYMAN.
ALBERT M. LANE.